US012141646B2

(12) United States Patent
Panayiotou et al.

(10) Patent No.: US 12,141,646 B2
(45) Date of Patent: Nov. 12, 2024

(54) OBJECT DETECTION-BASED CONTROL OF PROJECTED CONTENT

(71) Applicant: CFA Properties, Inc., Atlanta, GA (US)

(72) Inventors: Andreas Panayiotou, Atlanta, GA (US); Nathaniel McFarland, Mableton, GA (US)

(73) Assignee: CFA Properties, Inc., Atlanta, GA (US)

( * ) Notice: Subject to any disclaimer, the term of this patent is extended or adjusted under 35 U.S.C. 154(b) by 0 days.

(21) Appl. No.: 18/364,051

(22) Filed: Aug. 2, 2023

(65) Prior Publication Data

US 2024/0028844 A1 Jan. 25, 2024

Related U.S. Application Data

(63) Continuation of application No. 17/581,201, filed on Jan. 21, 2022, now Pat. No. 11,755,851, which is a (Continued)

(51) Int. Cl.
*G06K 7/10* (2006.01)
*G06K 7/00* (2006.01)
(Continued)

(52) U.S. Cl.
CPC ....... *G06K 7/10366* (2013.01); *G06K 7/0008* (2013.01); *G06K 19/0723* (2013.01); *G06K 19/07749* (2013.01); *G06Q 10/087* (2013.01)

(58) Field of Classification Search
CPC ............. G06K 7/10366; G06K 7/0008; G06K 19/0723; G06K 19/07749; G06Q 10/087;
(Continued)

(56) References Cited

U.S. PATENT DOCUMENTS 6,352,478 B1 3/2002 Gabai et al.
6,690,402 B1 2/2004 Waller et al.
(Continued)

FOREIGN PATENT DOCUMENTS

CN 105049763 A 11/2015
CN 105049763 B 10/2018
(Continued)

OTHER PUBLICATIONS

U.S. Appl. No. 17/581,201, filed Jan. 21, 2022, U.S. Pat. No. 11,755,851, Issued.
(Continued)

*Primary Examiner* — Curtis J King
(74) *Attorney, Agent, or Firm* — Alston & Bird LLP

(57) ABSTRACT

A process for triggering projected displays can comprise determining that an RFID device has moved within a predetermined range of a first interrogator, wherein the RFID device is carried by a user. The RFID device can be interrogated to determine a first identifier. Based on the first identifier, an identity of the user can be determined. A projection command can be transmitted to a projection source, wherein the projection command comprises the identity of the user and instructive indicia comprising information about a toy, wherein the toy comprises a second RFID device.

9 Claims, 8 Drawing Sheets

Related U.S. Application Data continuation of application No. 17/000,972, filed on Aug. 24, 2020, now abandoned.

(60) Provisional application No. 62/890,931, filed on Aug. 23, 2019.

(51) Int. Cl.
*G06K 19/07* (2006.01)
*G06K 19/077* (2006.01)
*G06Q 10/087* (2023.01)

(58) Field of Classification Search
CPC .... G06F 3/0325; A63F 13/211; A63F 13/213; A63F 13/63; A63F 2300/69; G06T 19/006; G06T 2215/16
See application file for complete search history.

(56) References Cited

U.S. PATENT DOCUMENTS

| | | |
|---|---|---|
| 6,761,637 B2 | 7/2004 | Weston et al. |
| 6,967,566 B2 | 11/2005 | Weston et al. |
| 7,330,117 B2 | 2/2008 | Ferguson et al. |
| 7,488,231 B2 | 2/2009 | Weston |
| 7,500,917 B2 | 3/2009 | Barney et al. |
| 7,614,958 B2 | 11/2009 | Weston et al. |
| 7,801,575 B1 | 9/2010 | Balardeta et al. |
| 7,878,905 B2 | 2/2011 | Weston et al. |
| 8,423,431 B1 | 4/2013 | Rouaix et al. |
| 8,702,515 B2 | 4/2014 | Weston et al. |
| 8,827,761 B2 | 9/2014 | Lipman et al. |
| 9,132,346 B2 * | 9/2015 | Huebner ............... A63F 13/655 |
| 9,148,202 B2 | 9/2015 | Ackley et al. |
| 9,218,697 B2 * | 12/2015 | McCloskey ........... A63F 13/213 |
| 9,299,013 B1 * | 3/2016 | Curlander .............. G06V 40/20 |
| 9,446,319 B2 | 9/2016 | Barney et al. |
| 9,465,984 B2 | 10/2016 | Watanabe et al. |
| 9,600,999 B2 | 3/2017 | Stenzler |
| 9,837,043 B1 | 12/2017 | Patel |
| 9,881,581 B2 | 1/2018 | Vandoros |
| 9,931,578 B2 | 4/2018 | Weston |
| 10,048,043 B2 | 8/2018 | Rahmanian |
| 10,058,775 B2 | 8/2018 | Segal |
| 10,360,419 B1 | 7/2019 | Yeh et al. |
| 10,614,271 B2 | 4/2020 | Coassairt et al. |
| 10,845,975 B2 | 11/2020 | Vyas et al. |
| 10,940,796 B2 | 3/2021 | Yesh et al. |
| 11,010,739 B2 | 5/2021 | Bell et al. |
| 11,074,421 B1 | 7/2021 | Le Cam et al. |
| 11,194,464 B1 * | 12/2021 | Flick .................. A63F 13/2145 |
| 11,755,851 B2 | 9/2023 | Panayiotou et al. |
| 2001/0034257 A1 | 10/2001 | Weston et al. |
| 2005/0059317 A1 | 3/2005 | McEachen et al. |
| 2005/0128184 A1 | 6/2005 | McGreevy |
| 2005/0272502 A1 * | 12/2005 | Marks ................... A63F 13/428 463/36 |
| 2006/0001543 A1 * | 1/2006 | Raskar ..................... G01S 5/16 340/572.1 |
| 2007/0019888 A1 | 1/2007 | Larking |
| 2007/0254739 A1 * | 11/2007 | Wada ...................... A63F 13/00 463/36 |
| 2008/0007400 A1 | 1/2008 | Murphy |
| 2008/0252425 A1 | 10/2008 | Okegawa et al. |
| 2008/0273684 A1 | 11/2008 | Profanchik |
| 2009/0104592 A1 * | 4/2009 | Miltenberger ........... G09B 7/00 434/362 |
| 2009/0163262 A1 * | 6/2009 | Kang ................. A63B 24/0062 463/43 |
| 2009/0243969 A1 | 10/2009 | Matsubara et al. |
| 2010/0003651 A1 * | 1/2010 | Zilber ....................... A63F 9/24 463/31 |
| 2010/0130286 A1 | 5/2010 | Ackley et al. |
| 2010/0173710 A1 | 7/2010 | Marks |
| 2011/0053688 A1 | 3/2011 | Crawford et al. |
| 2011/0193958 A1 | 8/2011 | Martin et al. |
| 2012/0204307 A1 | 8/2012 | De Mattei et al. |
| 2012/0235884 A1 | 9/2012 | Miller et al. |
| 2012/0235885 A1 | 9/2012 | Miller et al. |
| 2012/0249741 A1 * | 10/2012 | Maciocci .............. G06T 19/006 348/51 |
| 2012/0249797 A1 | 10/2012 | Haddick et al. |
| 2012/0326862 A1 | 12/2012 | Kwak |
| 2012/0326874 A1 | 12/2012 | Kwak et al. |
| 2013/0107042 A1 | 5/2013 | Forster |
| 2013/0120449 A1 | 5/2013 | Ihara et al. |
| 2013/0127980 A1 | 5/2013 | Haddick et al. |
| 2013/0135081 A1 * | 5/2013 | McCloskey ........... A63F 13/213 340/5.8 |
| 2014/0002495 A1 | 1/2014 | Lamb et al. |
| 2014/0002496 A1 | 1/2014 | Lamb et al. |
| 2014/0080109 A1 * | 3/2014 | Haseltine ................ A63F 13/42 434/308 |
| 2014/0097940 A1 | 4/2014 | Kwak |
| 2014/0097941 A1 | 4/2014 | Kwak |
| 2015/0042795 A1 * | 2/2015 | Tsuria .................... H04N 23/00 348/143 |
| 2015/0052253 A1 | 2/2015 | Johnson et al. |
| 2015/0084857 A1 | 3/2015 | Kimura |
| 2016/0184698 A1 | 6/2016 | Tan |
| 2017/0075116 A1 | 3/2017 | Gardiner |
| 2017/0097676 A1 * | 4/2017 | Lazor ...................... G06F 3/017 |
| 2017/0116446 A1 | 4/2017 | Sample et al. |
| 2017/0128851 A1 | 5/2017 | Naney et al. |
| 2017/0255898 A1 | 9/2017 | Thomas |
| 2018/0085663 A1 | 3/2018 | Vlasak et al. |
| 2018/0290068 A1 | 10/2018 | Moody |
| 2019/0121522 A1 * | 4/2019 | Davis ..................... G06V 40/28 |
| 2019/0122292 A1 * | 4/2019 | Riggins ............. G06Q 30/0643 |
| 2019/0126135 A1 | 5/2019 | Tan |
| 2019/0220634 A1 | 7/2019 | Cossairt et al. |
| 2019/0297307 A1 | 9/2019 | Tseng et al. |
| 2021/0042993 A1 * | 2/2021 | Tagra ...................... G06T 11/60 |
| 2021/0056272 A1 | 2/2021 | Panayiotou et al. |
| 2022/0006892 A1 | 1/2022 | Perkins et al. |
| 2022/0250844 A1 * | 8/2022 | Kreis .................... B65G 1/1375 |
| 2022/0317868 A1 * | 10/2022 | Davis ................. G02B 27/0172 |
| 2022/0326841 A1 * | 10/2022 | Davis .................. G06F 3/04883 |
| 2022/0327298 A1 | 10/2022 | Panayiotou et al. |

FOREIGN PATENT DOCUMENTS

| | | |
|---|---|---|
| WO | WO 2007/144167 A2 | 12/2007 |
| WO | WO-2012/167301 A1 | 12/2012 |

OTHER PUBLICATIONS

U.S. Appl. No. 17/000,972, filed Aug. 24, 2020, 2021/0056272, Abandoned.

Kriara, Lito et al., "RFID Shakables: Pairing Radio-Frequency Identification Tags with the Help of Gesture Recognition," *CoNEXT '13: Proceedings of the Ninth ACM Conference on Emerging Networking Experiments and Technologies*, Dec. 9, 2013, pp. 327-332, ISBN:978-1-4503-2101-3, available at: https://doi.org/10.1145/2535372.2535404.

De Albuquerque, Anna Priscilla et al., "Toy User Interfaces: Systematic and Industrial Mapping," *Journal of Systems Architecture: The EUROMICRO Journal*, vol. 97, Issue C, Aug. 2019, pp. 77-106, available online at https://doi.org/10.1016/j.sysarc.2018.12.001.

* cited by examiner

OBJECT DETECTION-BASED CONTROL OF PROJECTED CONTENT

CROSS-REFERENCE TO RELATED APPLICATIONS

This application claims priority to U.S. patent application Ser. No. 17/581,201, filed Jan. 21, 2022, which claims the benefit of and priority to U.S. Patent Application No. 62/890,931, filed Aug. 23, 2019, entitled "SYSTEMS AND METHODS FOR GENERATING AND TRIGGERING DISPLAY OF DIGITAL CONTENT," which is incorporated herein by reference in its entirety.

TECHNICAL FIELD

The present systems and methods relate generally to systems and methods for triggering displays of digital content.

BACKGROUND

Previous projection systems may fail to provide for interactive and customized projection events. For example, previous systems may rely on light-based sensors for triggering a projection; however, such sensors may fail to identify who or what specifically triggered the projection. As such, customization and subject-based control of projection composition and display cannot be achieved. Other approaches may limit the association to a single subject, which can be undesirable, for example, if an object is to cause different projection events depending on who possesses the object.

Therefore, there is a long-felt but unresolved need for a system or process that provides for more customized control of and condition-dependent interactions with projected content.

BRIEF SUMMARY OF THE DISCLOSURE

At a high level, the present technology relates to an interactive, trigger-able projection system that allows for initiation of various projections and projection-centered experiences in response to detected placement and/or movement of one or more objects. The system includes a physical environment (e.g., a room) that contains projection technology and one or more objects (e.g., toys) that may trigger projection activities upon their placement and/or movement in a particular region of the environment. The one or more objects can contain, or otherwise include, radio frequency identification ("RFID") tags that can communicate with various RFID sources (e.g., interrogators or readers) placed throughout the environment. The system can include subjects (for example, children) that move the one or more objects throughout the room (e.g., as an objective of play). The RFID sources of the environment can interrogate the one or more RFID tags to detect and track locations and positions of the one or more objects. Upon interrogation, an RFID tag can transmit an identifier to an RFID source, and the RFID source can transmit both the received identifier and a second identifier (associated with the RFID source) to the system. Upon receiving and processing the identifiers, the system can trigger one or more displays of digital content (e.g., on a display in the environment).

In various embodiments, any RFID tag or source of the present system can include a unique identifier (ID) that is associated, in a database of the system, with additional details regarding the source, or tag, and predefined projection commands. For example, the system may include at least one database that associates an identifier (for a particular RFID tag) with location and object data that describes a) within which object the particular RFID tag is installed, b) where in a play area the object is initially located, and c) one or more projection commands. As described herein, an RFID interaction generally refers to an event wherein an RFID tag is interrogated by an RFID source, causing the RFID tag to enter a powered state and transmit a signal to the RFID source. The RFID sources can each be operatively connected to a networked environment that coordinates RFID interaction processing and recording, and projection activation. Accordingly, using the RFID sources and various system elements, the system can detect any and all RFID interactions in an environment and can coordinate the display of digital content (throughout the environment) in response to detected RFID interactions.

As mentioned above, the present system leverages RFID technology to coordinate and trigger various projection displays throughout a physical environment. The physical environment can include floors, walls, and other structural features that include RFID sources. The physical environment may further include RFID-enabled toys distributed throughout the environment, and subjects that wear RFID-enabled wristbands that communicate with RFID elements of the environment (to initiate various projections). The system can utilize interactions of the RFID components to detect placement of a particular toy in a particular location, and, upon doing so, trigger one or more projection sources to display digital content (in the environment). While the toys do not perform any actions in response to RFID interactions, the toys can serve as triggers for other components of a system that generate specific content and/or perform certain actions (e.g., in response to RFID interactions).

In one non-limiting exemplary scenario, a child plays with a train on a floor, wherein various visual content (e.g., a track with cars at a crossing) is being projected onto the floor. As the child moves the train over a particular spot on the track (e.g., a projection of a railway crossing), an RFID source in the floor can interrogate the RFID tag of the train. The system can process identifiers received from the RFID source and trigger a projection source to display additional digital content (onto the floor). The additional digital content can include railroad crossing arms going down on either side of the track and cars stopped on either side of the track (e.g., as the cars await passage of the train).

The system can also include one or more computer vision elements that track and record data describing positions and orientations of objects throughout the environment. The system can process and analyze the collected computer vision data to configure and trigger digital content in the environment. According to one example, a play area may include random arrangement of a multitude of oversized tangram pieces. One or more computer vision sources (as described herein) can be oriented above the play area and can collect computer vision data that is processed and analyzed, by the system, to determine positions and orientations of the tangrams pieces, thereby informing the system of each piece's location in the play area. The system can also store one or more datasets of computer vision data that correspond to one or more particular tangram piece arrangements (i.e., tangram solutions).

Initially, the system can trigger digital content that includes a visualization of the tangram pieces (shown in matching arrangement and orientation to the physical tangram pieces). The digital content can also include, but is not limited to, projected renderings of one or more children playing with the tangram pieces and a projected assistive character that provides encouragement and/or direction to the one or more children. In at least one embodiment, the digital content can include a partial or full tangram arrangement (for example, an ideal tangram arrangement) that further directs the arrangement of the tangram pieces. The one or more children in the play area may be presented with the ideal tangram arrangement via the digital content, or another source. The one or more children may manipulate and arrange the tangram pieces to form the ideal arrangement. As the one or more children arrange the tangram pieces, the computer vision sources can continue to determine and record the position of each piece. The system can receive the determined positions and cause one or more projection sources to display a rendered visualization of the tangram pieces in which the rendered positions of the tangram pieces match the recorded tangram positions. As the children continue arranging the pieces, the system can continue determining and recording the positions of the tangram pieces and can continue determining if the ideal arrangement has been achieved. Upon determining that the ideal arrangement has been achieved, the system can trigger one or more projection sources to display digital content acknowledging and/or awarding completion of the tangram puzzle. In at least one embodiment, the system can also initiate a new tangram puzzle and trigger the one or more projection sources to display a new ideal arrangement that the one or more children may attempt to achieve.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
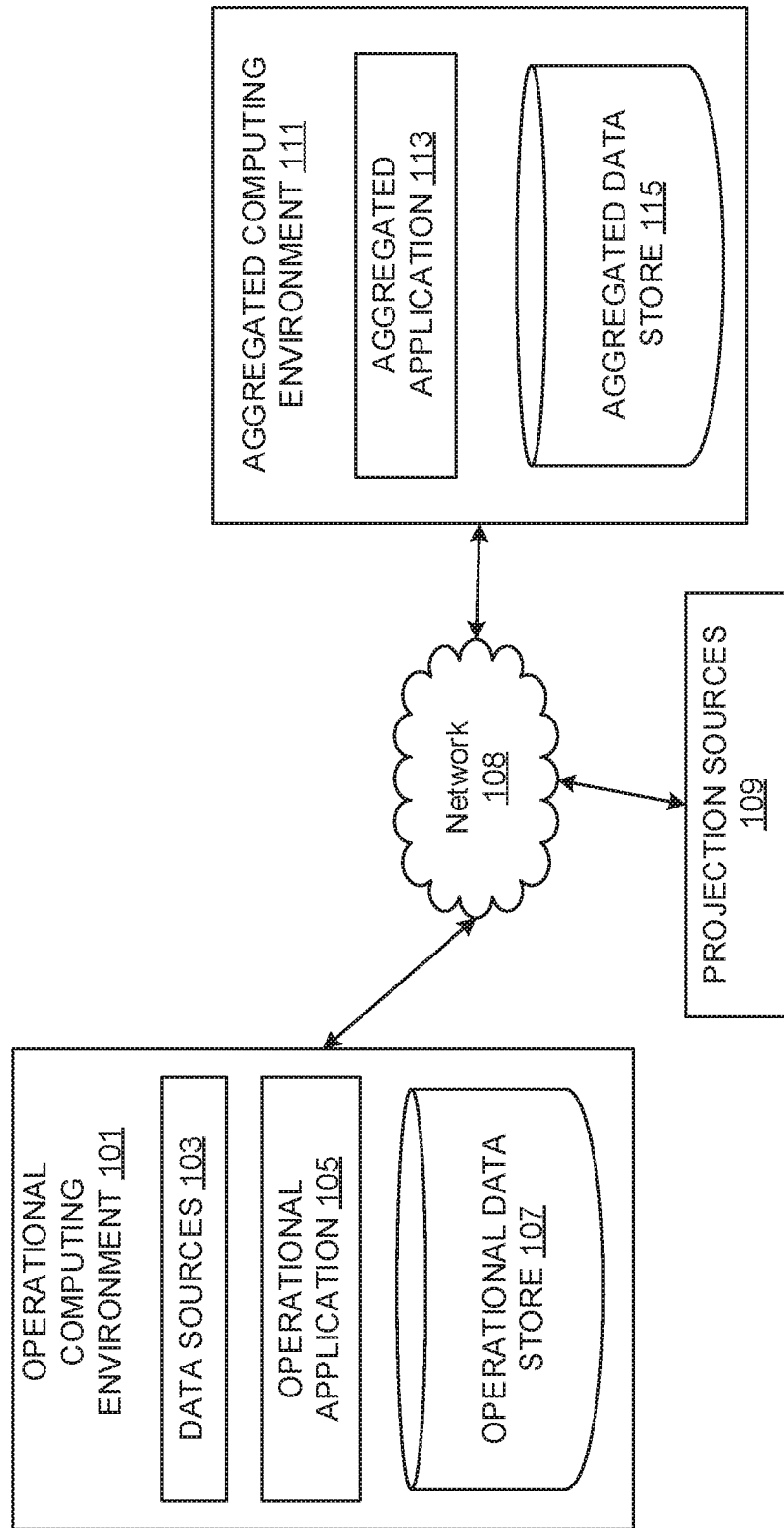
FIG. 1 illustrates an exemplary networked computing environment according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to detecting objects in a play area and triggering displays of digital content.

In at least one embodiment, the present disclosure provides systems and methods for detecting and tracking objects in a particular environment, and, based on detected and/or tracked object positions, triggering display of digital content. For illustrative purposes, the present systems and methods are described in the context of an interactive play environment for children.

Briefly described, the present disclosure provides systems and methods for detecting and/or tracking a particular object in a particular area of a play environment, processing detected and tracked object positions in the particular area, determining if a particular interaction has occurred, and, upon determining that a particular interaction has occurred, triggering display of digital content in the play environment. For illustrative purposes, the present systems and methods are described in the context of children playing in a play area; however, other embodiments directed towards alternate or additional subjects and environments are contemplated.

The system includes at least one physical environment in which a subject interacts with a variety of objects (e.g., toys) and apparatuses. The at least one physical environment can include one or more RFID sources and one or more computer vision sources. The variety of objects and apparatuses may include RFID tags (as described herein). In various embodiments, an RFID tag of the present system (e.g., whether disposed in a wristband, or otherwise) may include a unique RFID identifier that can be associated with a bearer of the RFID tag (e.g., an object, apparatus, subject etc.). Thus, an RFID tag borne by an object may include a unique RFID identifier that associates the object with the RFID tag. The RFID tag may also include the unique RFID identifier in any and all transmissions occurring from the RFID tag to one or more RFID sources. Thus, the system, via the one or more RFID sources, can receive data (from an RFID tag) that is uniquely associated with an object, apparatus, location, subject, etc. Accordingly, the system can collect data regarding an object's location and placement as the object proceeds through a particular environment (e.g., while being transported by a subject or another object). In at least one embodiment, the system may collect data (via RFID and computer vision sources) pertaining to a location of an object within a particular environment, a proximity of a object to a second object, an interaction of a subject with an object, an interaction of a subject with an environmental feature, and any combination of object location, interaction and proximity to another object, to an apparatus, to a location, or to a subject.

Using RFID data, computer vision data, and other data described herein, the system can collect and analyze data to generate and trigger digital content displays in an environment. The system can perform one or more algorithmic methods, machine learning methods and pattern recognition methods to evaluate an object's position and orientation, and trigger content accordingly.

Exemplary Embodiments

Referring now to the figures, for the purposes of example and explanation of the fundamental processes and components of the disclosed systems and methods, reference is made to FIG. 1, which illustrates a networked computing environment 100. As will be understood and appreciated, the networked environment 100 shown in FIG. 1 represents merely one approach or embodiment of the present system, and other aspects are used according to various embodiments of the present system.

With reference to FIG. 1, shown is a networked environment 100 according to various embodiments. The networked environment 100 can collect data from a physical environment, process collected data, and generate and transmit commands to various components in the physical environment (as described herein). In one or more embodiments, the networked environment 100 collects and processes data, and commands various physical environment components (e.g., projectors, or the like), thereby providing an interactive, trigger-able projection system that allows for initiation of various projections and projection-centered experiences in response to detecting placement and/or movement of one or more objects and/or subjects. For example, a play environment may include a barnyard play area. The networked environment 100 can command a projection source 109, in the play area, to display, on a floor of the play area, a fielded landscape projection. The floor may include one or more RFID sources, and the play area may include a plurality of toy farm animals, and, in addition, each toy farm animal may include an RFID tag. A child picks up and places a toy cow onto the floor. The one or more RFID sources can interrogate the RFID tag of the toy cow, and the networked environment 100 can process the collected data and generate a projection command. The networked environment 100 may transmit the projection command to the projection source. The projection source 109 can process the command and display, on the floor, animations of additional projected cows approaching the toy cow, and projected animations of fencing emerging from the ground around the toy and projected cows, thereby forming a projected cow corral.

The networked environment 100 may include an operational environment 101 and an aggregated computing environment 111 that are in data communication with each other via at least one network 108. The network 108 includes, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, and other types of networks.

The operational environment 101 and the aggregated environment 111 may include, for example, a server computer or any other system providing computing capability. Alternatively, the operational environment 101 and the aggregated environment 111 may employ computing devices that may be arranged, for example, in one or more server banks or computer banks or other arrangements. Such computing devices may be located in a single installation or may be distributed among many different geographical locations. For example, the operational environment 101 and the aggregated environment 111 may include computing devices that together may include a hosted computing resource, a grid computing resource, and/or any other distributed computing arrangement. In some cases, the operational environment 101 and the aggregated environment 111 may correspond to an elastic computing resource where the allotted capacity of processing, network, storage, or other computing-related resources may vary over time. In some embodiments, the operational environment 101 and the aggregated environment 111 may be executed in the same computing environment.

Various applications and/or other functionality may be executed in the operational environment 101 according to various embodiments. The operational environment 101 may include and/or be in communication with data sources 103. The operational environment 101 can include an operational application 105 that can receive and process data from the data sources 103. The operational application 105 can include one or more processors and/or servers, and, and can be connected to an operational data store 107. The operational data store 107 may organize and store data, sourced from the data sources 103, that is processed and provided by the operational application 105. Accordingly, the operational data store 107 may include one or more databases or other storage mediums for maintaining a variety of data types. The operational data store 107 may be representative of a plurality of data stores, as can be appreciated. Data stored in the operational data store 107, for example, can be associated with the operation of various applications and/or functional entities described herein. Data stored in the operational data store 107 may be accessible to the operational environment 101 and to the aggregated computing environment 111. The aggregated computing environment 111 can access the operational data store 107 via the network 108.

The aggregated environment 111 may include an aggregated application 113. The aggregated application 113 may receive and process data from the operational environment 101, from the projection source 109, from the third party service 123, and from the client device 125. The aggregated application 113 may receive data uploads from the operational environment 101, such as, for example, from the operational application 105 and operational data store 107. In at least one embodiment, data uploads between the operational environment 101 and aggregated computing environment 111 may occur manually and/or automatically, and may occur at a predetermined frequency (for example, daily) and capacity (for example, a day's worth of data).

The aggregated environment 111 may further include an aggregated data store 115. The aggregated data store 115 may organize and store data that is processed and provided by the aggregated application 113. Accordingly, the aggregated data store 115 may include one or more databases or other storage mediums for maintaining a variety of data types. The aggregated data store 115 may be representative of a plurality of data stores, as can be appreciated. In at least one embodiment, the aggregated data store 115 can be at least one distributed database (for example, at least one cloud database). Data stored in the aggregated data store 115, for example, can be associated with the operation of various applications and/or functional entities described herein. In at least one embodiment, the operational data store 107 and the aggregated data store 115 may be a shared data store (e.g., that may be representative of a plurality of data stores).

The operational data store 107 may provide or send data therein to the aggregated computing environment 111. Data provided by the operational data store 107 can be received at and processed by the aggregated application 113 and, upon processing, can be provided to the aggregated data store 115 (e.g., for organization and storage). In one embodiment, the operational data store 107 provides data to the aggregated data store 115 by performing one or more data batch uploads at a predetermined interval and/or upon receipt of a data upload request (e.g., at the operational application 105).

The networked environment 100 can also include one or more projection sources 109. The projection sources 109 can include, but are not limited to, machines and apparatuses for providing visible displays of digital content. The projection sources 109 can receive commands from the operational environment 101 and/or the aggregated computing environment 111. In at least one embodiment, a received projection command can cause the projection sources 109 to display content provided in the command, or otherwise provided by the networked environment 100. Accordingly, upon receipt of a command, the projection sources 109 can process the command to obtain the content and display the same.

Figure 2:
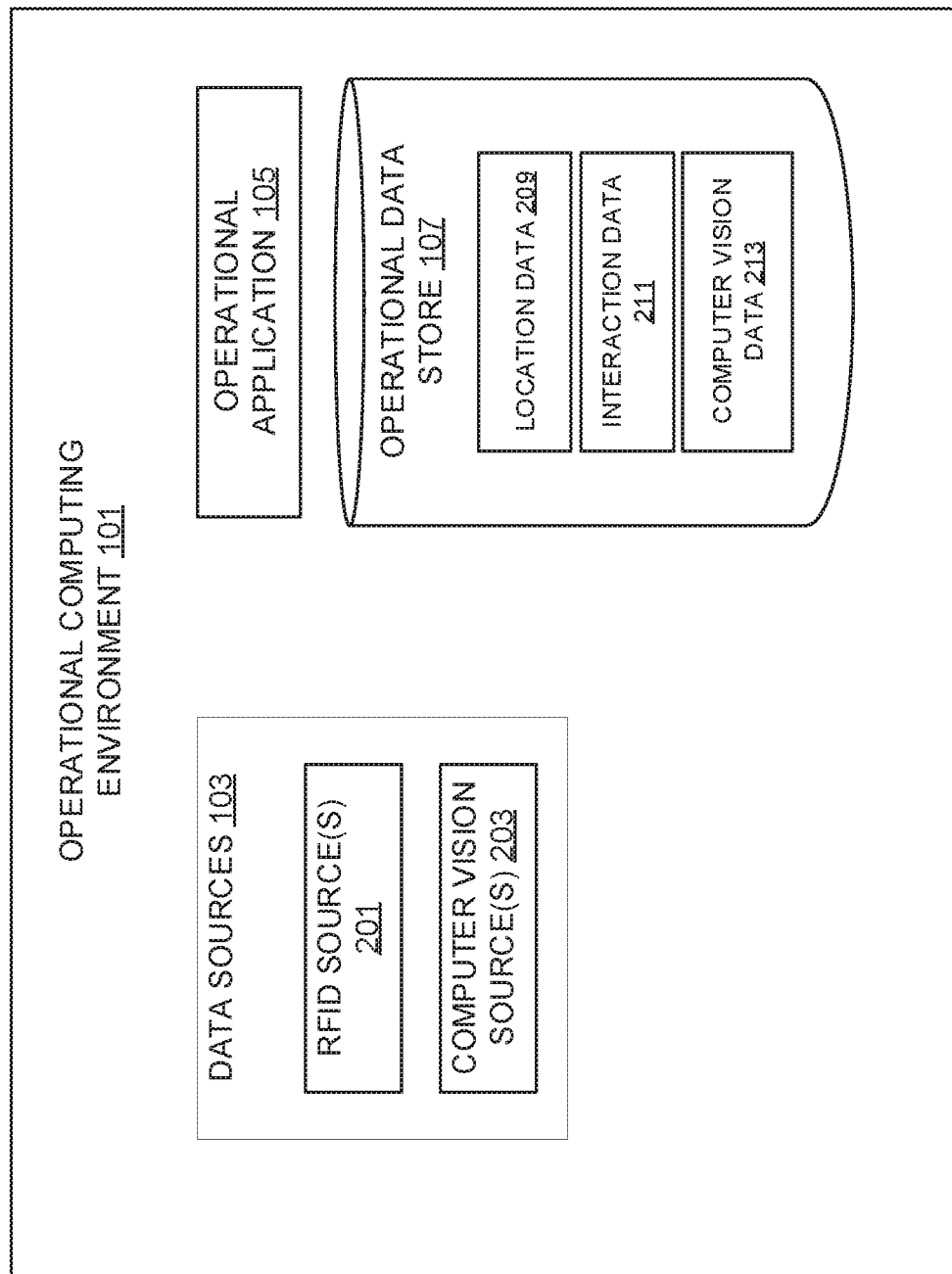
FIG. 2 illustrates an exemplary operational computing environment according to one embodiment of the present disclosure.

With reference to FIG. 2, shown is an operational environment 101 according to various embodiments. The data sources 103 can include RFID sources 201, computer vision sources 203, content sources 205, and input sources 207. The RFID sources 201 can be one or more radio frequency identification ("RFID") readers that may be placed throughout a particular physical environment. The RFID sources 201 can be coupled to the network 108 (FIG. 1). The RFID readers can interrogate RFID tags that are within range of the RFID readers. The RFID reader can read the RFID tags via radio transmission and can read multiple RFID tags simultaneously. The RFID tags can be embedded in various objects, such as toys, personal tags, or other objects. The objects may be placed throughout a play area for children. The RFID sources 201 can interact with both passive and active RFID tags. A passive tag refers to an RFID tag that contains no power source, but, instead, becomes operative upon receipt of an interrogation signal from an RFID source 201. Correspondingly, an active tag refers to an RFID tag that contains a power source and, thus, is independently operative. In addition to an RFID tag, the active tags can include an RFID reader and thus function as an RFID source 201. The active tag can include a long-distance RFID antenna that can simultaneously interrogate one or more passive tags within a particular proximity of the antenna.

The RFID sources 201 and RFID tags can be placed throughout a particular physical area. As an example, the RFID sources 201 can be placed in thresholds such as at doors, beneath one or more areas of a floor, and within one or more objects distributed throughout the play area. In one embodiment, the RFID sources 201 can be active RFID tags that are operative to communicate with the operational application 105. In various embodiments, the RFID tags may be embedded within wearables, such as wristbands, that are worn by children present in a play area.

The RFID sources 201 and RFID tags may each include a unique, pre-programmed RFID identifier. The operational data store 107 can include a list of RFID sources 201 and RFID tags including any RFID identifiers. The operational data store 107 can include corresponding entities onto or into which the RFID sources 201 or RFID tag is disposed. The operational data store 107 can include locations of the various RFID sources 201 and RFID tags. Thus, an RFID identifier can be pre-associated with a particular section of a play area, with a particular subject, with a particular or object, or a combination of factors. The RFID tags can include the RFID identifier in each and every transmission sourced therefrom.

Passive RFID tags can be interrogated by RFID sources 201 that include active tags and that are distributed throughout a play area. For example, a passive RFID tag may be interrogated by an active RFID tag functioning as an RFID source 201. The RFID source 201 can interrogate the passive RFID tag upon movement of the passive RFID tag within a predefined proximity of the active RFID source 201. The RFID source 201 can iteratively perform an interrogation function such that when the passive RFID tag moves within range, a next iteration of the interrogate function interrogates the passive RFID tag. Movement of a passive RFID tag within a predefined proximity of an RFID source 201 (e.g., wherein the movement triggers an interrogation or the interrogation occurs iteratively according to a defined frequency) may be referred to herein as a "location interaction." The predefined proximate can correspond to a reading range of the RFID source 201.

The operational application 105 may receive a transmission from an RFID source 201 following each occurrence of a location interaction. A transmission provided in response to a location interaction may include a first RFID identifier that is associated with a passive tag and a second RFID identifier that is associated with an RFID source 201. In some embodiments, the transmission may include a transmission from both a passive and active tag, or may only include a transmission from an active tag. In instances where a transmission is provided only by an active tag (e.g., an active tag that has experienced a location interaction with a passive tag), the active tag may first receive an interrogation transmission from the passive tag, the interrogation transmission providing a first RFID identifier that identifies the passive tag. In some embodiments, the transmission can include multiple RFID identifiers associated with more than one passive tag. The RFID source 201 may read more than one RFID tag located within a reading range. The RFID source 201 may transmit a list of RFID identifiers for the RFID tags read along with an RFID identifier for the RFID source 201.

As one example, a child in a play area may carry a toy that includes a passive RFID tag. The child may walk through a threshold into a particular area of the play area. The threshold may include an RFID source 201 that interrogates the toy's RFID tag, thereby causing a location interaction. The location interaction may include, but is not limited to, the RFID tag receiving an interrogation signal from the RFID source 201, the RFID tag entering a powered, operative state and transmitting a first RFID identifier to the RFID source 201, the RFID source 201 transmitting the first RFID identifier and a second RFID identifier (e.g., that is programmed within the RFID source 201) to an operational application 105. The operational application 105 can process the transmission and store data to an operational data store 107. The operational application 105 can determine the toy is now within the particular area based on receiving the first RFID identifier and the second RFID identifier. The operational application 105 can utilize data relating the first identifier to the toy and the second identifier to the particular area. Thus, a location interaction may allow the present system to record movement of a toy throughout a play area and, in particular, into and out of one or more particular areas of the play area.

The RFID sources 201 can also be included in one or more experiences configured and/or installed throughout a play area. In various embodiments, an experience may include, but is not limited to, a particular object (or set of objects), an apparatus and an interactive location provided in a play area. For example, an experience may include a particular train and a particular train zone of a play area. The particular train may include a passive RFID tag and the particular train zone may also include an RFID source 201 (e.g., disposed within a particular floor section of a play area). The RFID tag of the particular train and the RFID source 201 of the train zone may be in communication with each other. The RFID source 201 of the train zone and/or RFID tag of the particular train may also be in communication with an RFID tag of a subject (e.g., a subject wearing an RFID wristband) who enters the train zone and plays with the particular train. Per the present disclosure, an instance where communicative RFID activity occurs between a subject and an object and/or experience may be referred to as an "experience interaction." Accordingly, the present system may receive (e.g., via transmissions from RFID sources 201) data associated with any experience interaction occurring within a play area.

The computer vision sources 203 can include one or more computer vision apparatuses placed throughout a play area. The computer vision sources 203 can include an overhead camera, a wall-mounted camera, or some other imaging device. The computer vision sources 203 can stream a live or recorded video stream to the operational application 105. In some embodiments, one of the computer vision sources 203 can provide an infrared video stream. A computer vision apparatus may include, but is not limited to, an imaging component that collects visual data from a play area, a processing component that processes and analyzes collected visual data, and a communication component that is operative to transmit collected and/or processed visual data and, in some embodiments, analysis results to an operational environment 101 and, in particular, to an operational application 105. In some embodiments, the computer vision sources 203 may include only an imagining component and a communication component, and analysis of collected and/or processed visual data may occur elsewhere (for example, in an operational environment 101 or in an aggregated computing environment 111). Visual data collected by the computer vision sources 203 may be processed and/or analyzed using one or more computer vision algorithms to obtain one or more computer vision outputs. The computer vision outputs can include, but are not limited to, traffic patterns that illustrate movement trends of subjects through a play area (or a particular area of a play area), dwell times that indicate time spent by one or more subjects in a play area (or a particular area), and object recognitions that identify a particular object in a play area, and may also identify an action being performed on the particular object.

For example, the computer vision sources 203 may collect visual data of a child playing with a train in a toy room of a play area. The computer vision sources 203 may send the collected visual data to the operational application 105. The operational application 105 can analyze the visual data using one or more computer vision algorithms to generate one or more computer vision outputs. Based on the outputs, the operational application 105 can identify movement of the child into the toy room, provide a dwell time of the child within the toy room, and identify the train with which the child played.

As another example, the computer vision sources 203 may collect visual data of an oversized tangram puzzle, and pieces thereof, provided in a play area. The computer vision sources 203 may send the collected visual data to the system, or may itself perform analyses to generate one or more computer vision outputs. The one or more computer vision outputs (whether provided to or generated by the system) can cause the system to generate digital content and trigger projection sources 109 to display the generated content. The generated content can include, but is not limited to, digital renderings of the tangram pieces (as currently positions in the play area), one or more subjects interacting with the tangram pieces, an ideal tangram piece arrangement and a virtual assistive character that encourages and advises the one or more subjects on achieving the ideal arrangement (e.g., by positioning and orienting the tangram pieces. The computer vision sources 203 may continue collecting and analyzing visual data of the tangram puzzle. Upon detecting that the tangram pieces are in the ideal arrangement, the computer vision sources 203 can generate additional content (such as a recognition of achievement) and trigger the projection sources 109 to display the additional generated content.

As described herein, the operational application 105 may receive data from one or more data sources 103. The operational application 105 can process and convert received data into one or more formats prior to providing the data to the operational data store 107. The operational data store 107 may organize collected and received data in any suitable arrangement, format, and hierarchy. For purposes of description and illustration, an exemplary organizational structure is recited herein; however, other data organization schema are contemplated and may be utilized without departing from the spirit of the present disclosure.

The operational data store 107 may include location data 209. The location data 209 can include data associated with RFID location interactions (as described herein). The location data 209 can include data including, but not limited to, RFID identifiers associated with one or more objects, one or more locations (e.g., in a play area where RFID sources 201 have been placed) and one or more subjects. The location data 209 may be time series formatted such that a most recent entry is a most recent location interaction as experienced by a subject and a particular location in a play area, and recorded via RFID sources 201. Accordingly, the location data 209 can serve to illustrate movement of a subject into and out of a particular location in a play area. One or more entries associated with a location interaction may include, but are not limited to, first RFID identifier (e.g., associated with a passive RFID tag), a second RFID identifier (e.g., associated with an RFID source 201 that interrogated the tag), and a timestamp associated with the location interaction.

In an exemplary scenario, a subject carries a toy containing an RFID tag through a threshold (e.g., a doorway) that includes an RFID interrogator (as described herein). In the same scenario, as the subject passes within a predefined proximity (for example, 1 m) of the RFID interrogator, the RFID interrogator interrogates the RFID tag and receives a first RFID identifier. Continuing the scenario, the RFID source 201 transmits data (e.g., the first RFID identifier, a second RFID identifier, and metadata) to an operational application 105. In the same scenario, the operational application 105 receives and processes the data, and provides the processed data (e.g., now location data 209) to an operational data store 107. Continuing the scenario, the operational data store 107 organizes and stores the location data 209. Organization activities of the operational data store 107 can include, but are not limited to, updating one or more particular data objects, or the like, to include received location data 209 and/or other data (as described herein). In at least one embodiment, the operational data store 107 may organize particular location data 209, or any data, based on a received first and/or second RFID identifier.

The operational data store 107 can include interaction data 211. The interaction data 211 can be sourced from experience interactions (as described herein) and data thereof. Thus, interaction data 211 can include data associated with RFID object and experience interactions. The location data 209 can include data including, but not limited to, RFID identifiers associated with one or more subjects and one or more experiences (e.g., that provided in a play area and include RFID sources 201). The interaction data 211 may be time series formatted such that a most recent entry is a most recent experience interaction as experienced by a subject and one or more objects and/or particular regions of a play area, and recorded via RFID sources 201. Accordingly, the interaction data 211 can serve to illustrate instances where a subject experienced a particular experience interaction in a play area. One or more entries associated with an experience interaction may include, but are not limited to, a subject RFID identifier, one or more object RFID identifiers, a location RFID identifier, and a timestamp associated with the experience interaction.

In an exemplary scenario, a subject places a toy train (containing an RFID tag) within a predefined proximity of "train station" located on a floor of a play area, the floor beneath the train station containing an RFID source 201. The RFID source 201 interrogates the RFID tag and receives a first RFID identifier, and transmits data (e.g., the first RFID identifier, a second RFID identifier, and metadata) to an operational application 105. In the same scenario, the operational application 105 receives and processes the data, and provides the processed data (e.g., now interaction data 211) to an operational data store 107. Continuing the scenario, the operational data store 107 organizes and stores the interaction data 211.

The operational data store 107 can include computer vision data 213. The computer vision data 213 can include processed or unprocessed image data (and metadata) from one or more computer vision sources 203. Accordingly, the operational application 105 may receive data from the computer vision sources 203, process the data (if required), and provide the data (e.g., as computer vision data 213) to the operational data store 107 that organizes and stores the provided data.

Figure 3:
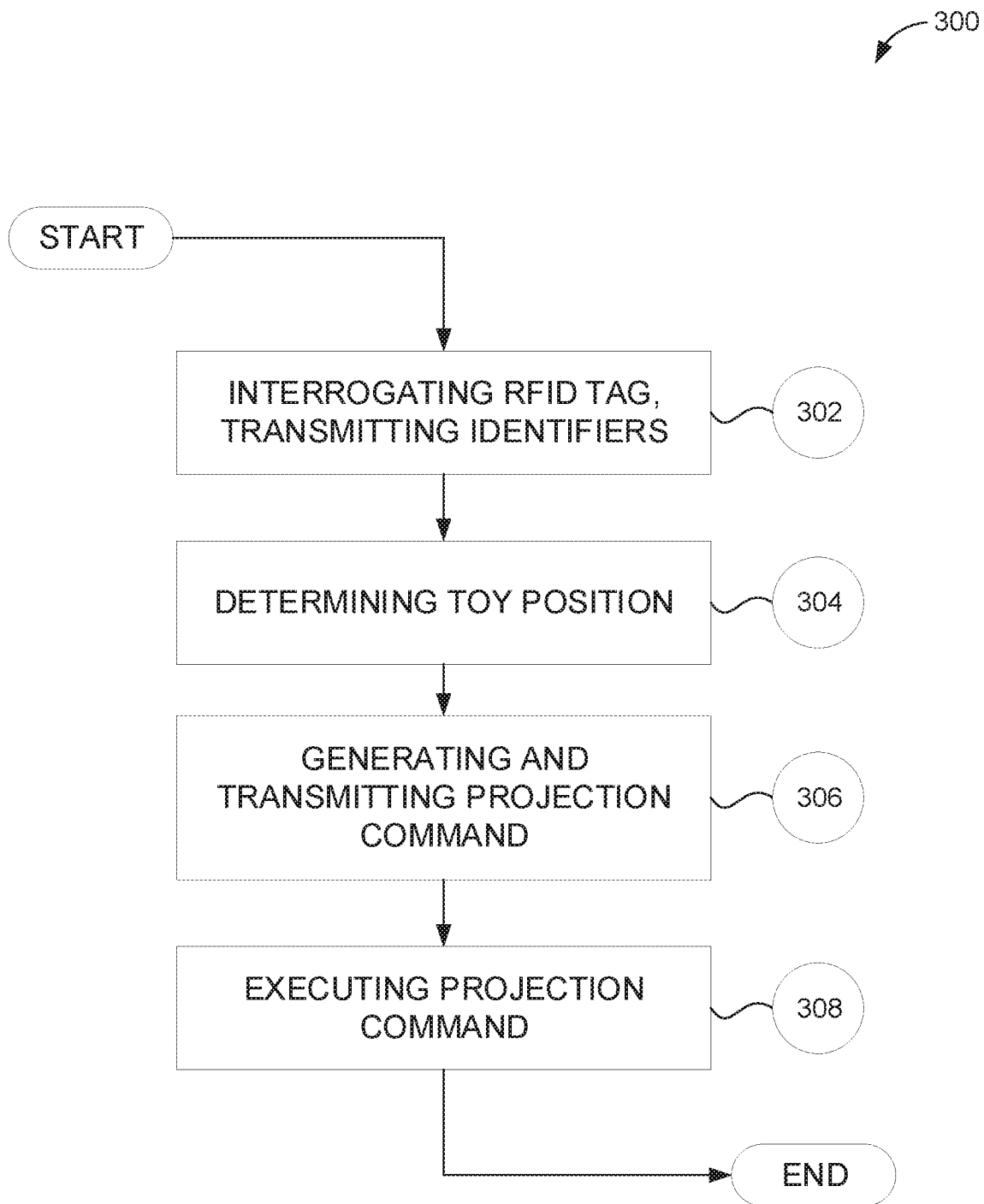
FIG. 3 is a flowchart describing an exemplary projection generation process, according to one embodiment of the present disclosure.

With reference to FIG. 3, shown is a RFID-triggered projection flowchart depicting a process 300, according to various embodiments. As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown. As an alternative, the flowchart of FIG. 3 may be viewed as depicting an example of elements of a method implemented in the operational environment 101 according to one or more embodiments.

The steps illustrated in process 300 and provided herein are described, for illustrative purposes, with respect to a play area having one or more toys and one or more particular play zones. In various embodiments, the one or more toys may include RFID tags, and the one or more particular play zones may each include one or more RFID sources.

At step 302, the process 300 includes interrogating an RFID tag to receive an RFID identifier. A toy can be positioned within a predefined proximity of an RFID source in a particular play zone. Upon the toy being positioned with the predefined proximity, the RFID source can interrogate the toy's RFID tag and receive a first RFID identifier. The first RFID identifier may be identical and/or equivalent to an associated RFID identifier stored within the system. Thus, the first RFID identifier may be uniquely associated with the toy.

Also at step 302, the RFID source can transmit the received first RFID identifier and a second RFID identifier to the system. The second RFID identifier can be an RFID identifier that, in the same manner as the first RFID identifier, is uniquely associated with the RFID source. In at least one embodiment, the RFID source may also interrogate an RFID tag carried or worn by a subject (e.g., that positioned the toy), and may receive a third RFID identifier that is uniquely associated with the subject.

At step 304, the process 300 includes determining a position of a toy. The system can receive and process the RFID identifiers to determine a position of the toy. The system can utilize relational tables and/or algorithmic and pattern recognition processes to determine, based on the RFID identifiers, what toy was positioned within the particular play zone, and into which particular play zone. In some embodiments, the system may only determine into which particular play zone the toy was positioned. In other words, the system may be toy identity-agnostic, requiring only receipt of a toy RFID identifier and an RFID source identifier to perform further processes. In at least one embodiment, the system can also process an additional RFID identifier to determine a particular subject that positioned the toy within the particular play zone.

At step 306, the process 300 includes generating and transmitting a projection command. The system can utilize the determined toy position to generate and/or identify a projection command. As described herein, a projection command can refer to executable program code that, when received and processed by a projection source 109 (FIG. 1), causes the projection source 109 to activate and display digital content. Accordingly, a projection command can include, but is not limited to, a projection source identifier that is uniquely associated with a particular projection source disposed in a play environment, digital content data that, when processed by a projection source, provides digital content to be displayed by the projection source, one or more projection parameters (e.g., duration, brightness, etc.), and executable program code that causes the projection source to generate a projection displaying the digital content.

In at least one embodiment, the present system can include a content generation engine (e.g., such as for example, a Unity™ game engine) to generate digital content, including digital content data, displayed by one or more projection sources. In one or more embodiments, use of a content generation engine to generate digital content allows for projection displays that augment a physical environment with virtual content and stimuli. For example, the present system may utilize one or more triggering elements (e.g., computer vision, RFID elements, etc.), a Unity™ game engine, and one or more projection sources to create an augmented reality room. The augmented reality room can include a plurality of elements (e.g., surfaces of various orientations and dimensions) onto which digital content may be projected. The projected digital content can include, but is not limited to, images, digital avatars, and dynamic content that simulate a modified and/or entirely alternate reality.

In an exemplary scenario, a play area can include a plurality of surfaces and physical structures onto which one or more projection sources may display digital content. The play area can include one or more computer vision sources that may detect movement and behavior of subjects in the environment, and interactions between subjects and projected digital content. The projected digital content can include, for example, bioluminescent surfaces (e.g., projected onto the surfaces described above) and bioluminescent butterflies. The one or more projection sources may iteratively update projected content displays to provide immersive and dynamic projection displays (e.g., including pulsating bioluminescent light effects, fluttering butterflies, etc.). In at least one embodiment, the one or more computer vision sources may trigger iterative updates in projected content by detecting movement of a subject throughout the play area. For example, a subject may stretch her hand towards a projection of bioluminescent butterflies. A computer vision source may detect, record, and process the hand movement (e.g., as computer vision data), and, based on the recorded movement, the system may trigger a projection source to update the butterfly projection to display the butterflies fluttering away from the subject's outstretched hand and flying to other areas of the play area, thereby creating an immersive augmented reality experience. Alternatively, the system may trigger a projection source to display the butterfly fluttering onto the subject's outstretched hand. In various embodiments, a computer vision source may continuously track the subject's hand and may provide computer vision data (indicating locations of the hand) to one or more projection sources, thereby allowing the projection sources to map and display projected content (e.g., the butterfly) directly onto the subject's hand, and continue displaying the content as the subject moves their hand.

The system can automatically generate a projection command using one or more stored datasets that relate combinations of received RFID identifiers (e.g., RFID tag and RFID source identifiers). In one or more embodiments, the system may store digital renderings of toys and other objects present in a play area and may insert one or more digital renderings of one or more specific toys into generated digital content based on received RFID tag identifiers. In at least one embodiment, the system may also store digital avatars of one or more subjects and may insert an associated digital avatar into the generated digital content based on received RFID tag identifiers. The system can transmit the generated projection command to one or more projection sources located within the particular play zone.

At step 308, the process 300 includes executing the projection command. The one or more projection sources can receive, process, and execute the projection command. The one or more projection sources can execute the command for a particular duration (e.g., as provided for in the projection command), or can execute the command continuously until receipt of an additional projection command.

Figure 4:
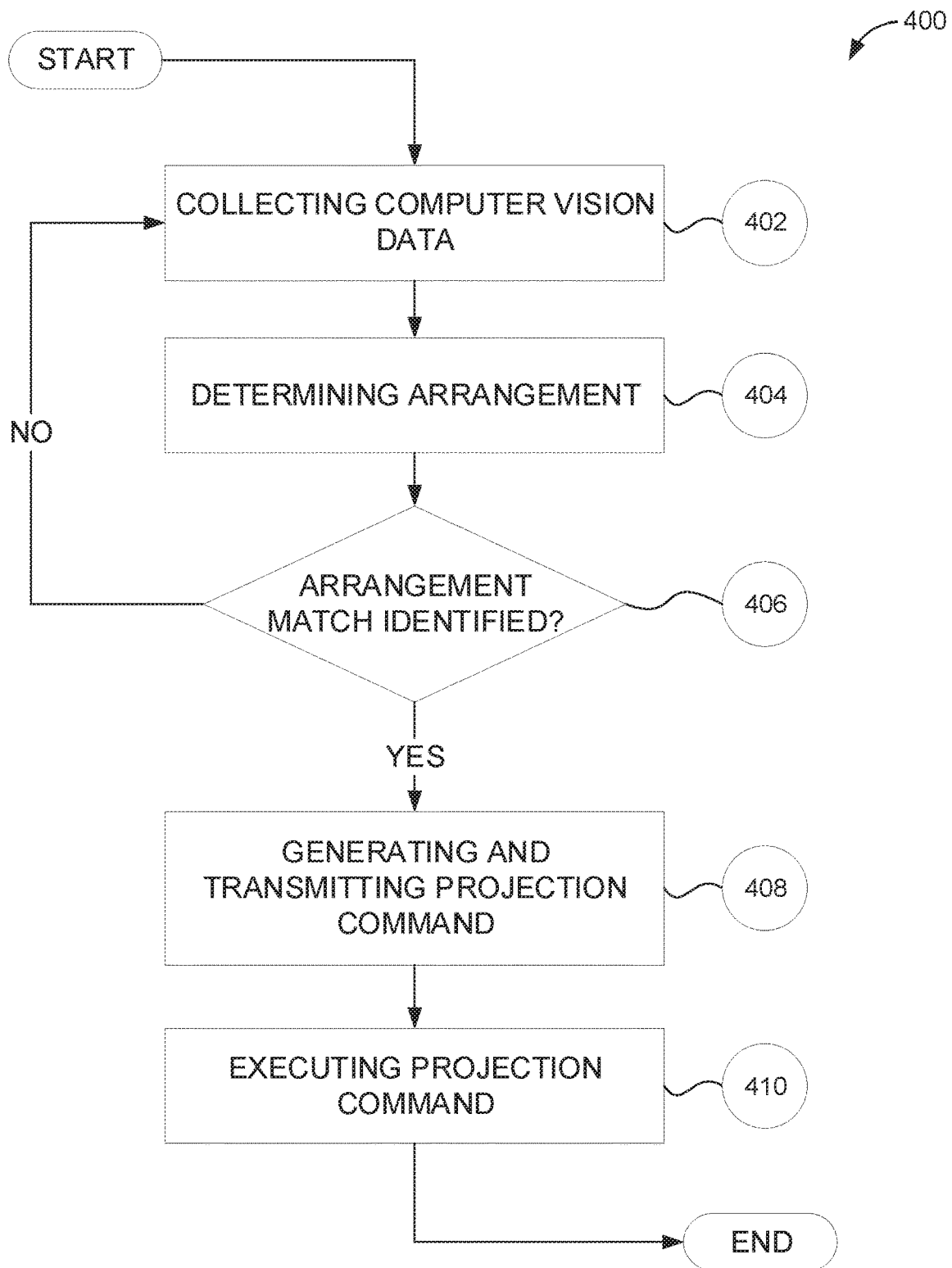
FIG. 4 is a flowchart of an exemplary projection generation process according to one embodiment of the present disclosure.

With reference to FIG. 4, shown is a computer vision-triggered projection flowchart depicting a process 400, according to various embodiments. The steps illustrated in the flowchart and provided herein are described, for illustrative purposes, with respect to a play area having one or more toys and one or more particular play zones. In various embodiments, the one or more particular play zones may each include one or more computer vision sources configured to collect and process visual data from an associated play zone. As an alternative, the flowchart of FIG. 4 may be viewed as depicting an example of elements of a method implemented in the operational environment 101 according to one or more embodiments.

At step 402, the process 400 includes one or more computer vision sources 203 collecting computer vision data and providing the collected computer vision data to the operational application 105. A computer vision source can collect computer vision data from a particular play zone. The computer vision source can perform data collection automatically and/or in response to receipt of a command (e.g., from the networked environment as illustrated in FIG. 1). The computer vision source can perform data collection continuously, or for a predetermined duration and frequency. The computer vision source can provide collected computer vision data to a processing environment which may be within the computer vision source itself or may be otherwise located within the networked environment.

At step 404, process 400 includes determining an arrangement. The operational application 105 can perform one or more algorithmic and pattern recognition processes to analyze the collected data, and determine an arrangement of objects, subjects, and other features present in the play zone. As described herein, an arrangement refers to physical positions of objects, subjects, and other features present in a play zone. An arrangement can be formed with reference to the play zone itself (e.g., a physical position of an object with reference to a floor of the play zone). An arrangement can also be formed between objects, subjects, and/or other features. For example, a play area may include one or more oversized puzzle pieces. A computer vision source in the play area can collect, from the play area, computer vision data. An operational application 105 can process the computer vision data and identify each puzzle piece (e.g., such as via shape and edge recognition. The operational application 105 can determine a physical location of each puzzle piece in relation to the play area floor and determine a physical location of each puzzle piece in relation to one or more other puzzle pieces. The operational application 105 can compare the determined locations to each other and/or to one or more predefined locations. Based on the comparisons, the operational application 105 can determine an arrangement of the puzzle pieces with reference to each other and/or the play area floor. In at least one embodiment, the system records a particular arrangement of one or more objects (and/or subjects and other features) within the play zone.

At step 406, the process 400 includes determining if an arrangement match is identified. As described herein, an arrangement match refers to congruity between a determined arrangement (e.g., as provided via one or more determined locations) and a stored arrangement. A stored arrangement refers to one or more data objects representative of a particular pattern, location, and/or orientation of objects, subjects, and/or other features in a play environment. The stored arrangement can be expressed mathematically (for example, as coordinates on one or more coordinate planes representative of a play area). The stored arrangement can also be expressed as a stored image, or the like. In the above puzzle example, a stored arrangement may include a stored image of a completed puzzle. The system can perform image recognition between the stored image and the computer vision data to determine if the one or more puzzle pieces are positioned in an arrangement identical to the stored image. The stored arrangement may also, or alternatively, include stored relational location values representative of relational locations of puzzle pieces in a completed arrangement. The system can compare the stored relational location values to determined relational location values (associated with the puzzle pieces in the play area). If the system determines that the stored and determined relational location values are identical (or satisfy a similarity threshold), the system can identify the congruity as an arrangement match.

The system can compare the determined arrangement to one or more predefined arrangements (e.g., stored in the system). The system can be configured to utilize a predetermined similarity threshold in determining a match between the determined arrangement and a predefined arrangement. Thus, if the system calculates that the determined arrangement and predefined arrangement present a similarity value that is above the predetermined threshold, the system concludes that the determined arrangement matches the predefined arrangement. If the system concludes that the determined arrangement matches the predefined arrangement, the system proceeds to step 408. If the system concludes that the determined arrangement match does not match a predefined arrangement, the system returns to step 402 and continues to collect computer vision data. In some embodiments, the system may proceed to steps 408 and 410 even if an arrangement match is not determined in step 406. In one or more embodiments, the system may dynamically generate a projection command based on processed computer vision data. The system may generate a projection command for digital content that provides a digital recreation of a play zone (e.g., as observed by a computer vision source), or one or more elements thereof.

At step 408, the process 400 includes generating and transmitting a projection command. The system can generate and transmit a projection command to one or more projection sources. The system can include one or more datasets that relate predefined arrangements to particular projection commands. Accordingly, to generate a projection command, the system can index stored projection commands and retrieve a particular projection command that is associated with the particular predefined arrangement that was earlier determined to match the determined arrangement. In one or more embodiments, the system can modify a retrieved projection command to include additional digital content (for example, a subject avatar, object rendering, etc.).

At step 410, the process 400 includes executing the projection command. The one or more projection sources can receive, process, and execute the projection command. In at least one embodiment, the system may perform the steps provided in the flowchart in a sufficiently minimal time period such that the projected digital content appears to dynamically and seamlessly appear in response to a triggering action (e.g., particular arrangement of one or more objects).

Additional Description of Particular Embodiments—Train Area

Figure 5:
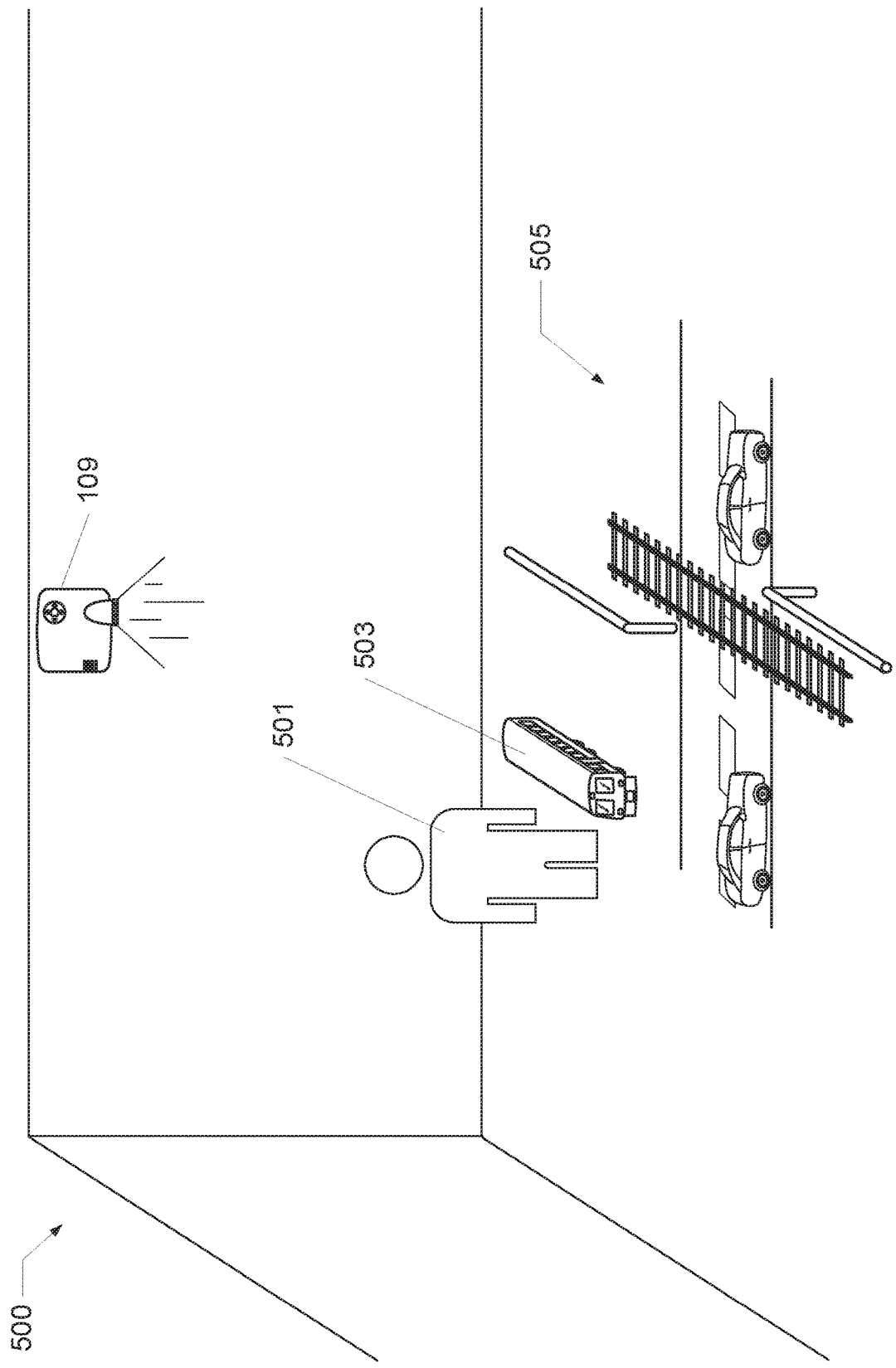
FIG. 5 illustrates an exemplary projection generation environment according to one embodiment of the present disclosure.

The following section provides exemplary descriptions of the present system. The descriptions herein are provided for the purposes of illustrating various elements of the system. All descriptions, embodiments, and the like are exemplary in nature and place no limitations on the present technology. With reference to FIG. 5, shown is a play area 500 according to various embodiments. The play area 500 can include a subject 501, an RFID object 503 (e.g., a toy train), and a projection source 109 (FIG. 1) that displays digital content 505. The play area 500 can also include one or more RFID sources (FIGS. 1-2, not illustrated in FIG. 5) that can interrogate a passive RFID tag contained within, or otherwise disposed on, the toy train 503. In at least one embodiment, the system can command the projection source 109 to display the digital content 505 in perpetuity until a projection-triggering event occurs, such as an interrogation of the train 503 by the one or more RFID sources. The digital content can include, but is not limited to, digital renderings of a railroad track and a railroad crossing. The railroad crossing can include crossing arms that can be configured in an open position to allow traffic or closed position to prevent traffic so a train may pass. As shown, the crossing arms are configured in an open upward position, and can also include cross-traffic in the form of rendered vehicles that traverse the railroad crossings. Thus, the digital content 505 can function as a display of a railroad crossing as would be typically encountered in the real world, absent a train.

Accordingly, the projection source 109 can be oriented to project downward onto various surfaces of the play area 500. The play area 500 can include the one or more RFID sources in a manner such that placement of the toy train 503 on the floor, within a predetermined proximity of the one or more RFID sources, causes interrogation of the toy train RFID tag (by the one or more RFID sources). In at least one embodiment, interrogation of the train RFID tag by the one or more RFID sources causes the system to determine a position and/or orientation of the train. Upon determining that the train is in a particular position and/or orientation, the system can generate one or more projection commands that modify behavior of the projection source 109 and cause display of additional digital content. The play area 500 provides an illustration of a play environment prior to placement of the train 503 (by the subject 501) and interrogation by the one or more RFID sources.

Figure 6:
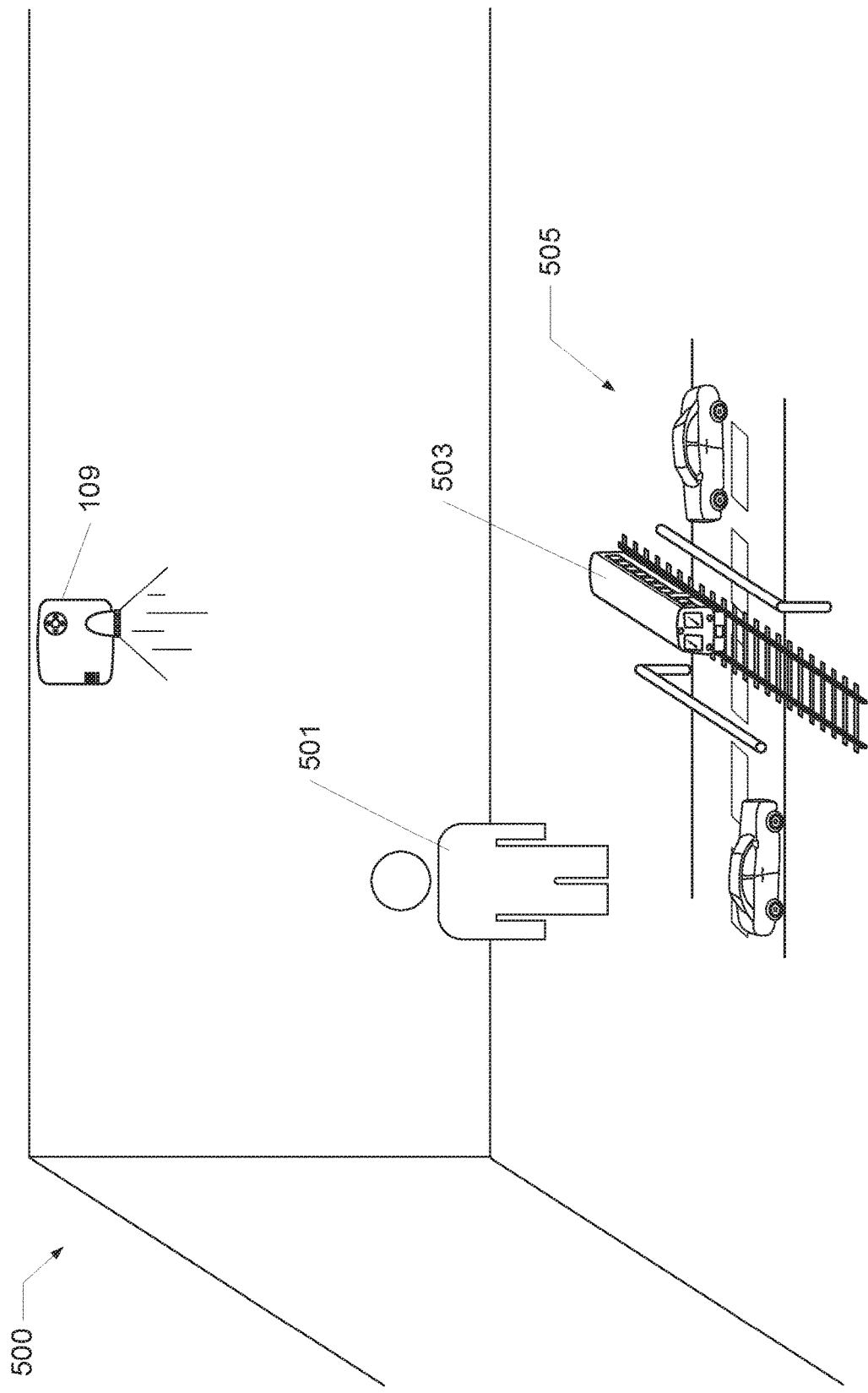
FIG. 6 illustrates an exemplary projection generation environment according to one embodiment of the present disclosure.

With reference to FIG. 6, shown is a play area 600, which may be substantially similar, but temporally subsequent, to the play area 500 (FIG. 5). The play area 600 provides an illustration of a play environment immediately following placement and interrogation of a train 503. As is illustrated, a subject 501 has positioned the train 503 within the play area 600, and within proximity of one or more RFID sources therein. The one or more RFID sources (not illustrated) interrogate the train 503, and the system processes the received RFID identifiers to determine a position of the train 503. The system determines that the train 503 is positioned with sufficient proximity to a particular RFID source. For example, the system may determine that the train 503 is positioned proximate to an RFID source installed in the floor beneath the projection 501 (FIG. 5). Accordingly, the system generated and transmitted a projection command to the projection source 109 that processed the command and, as caused by the command, displayed digital content 601. The digital content 601 can include, but is not limited to, the lowering of the railroad crossing arms and stoppage of thru-traffic across the railroad crossing. Thus, the digital content 505 can include a rendering of a railroad crossing as would be typically encountered in the real world when a train is present.

For example, interrogation of the train RFID tag can allow the system to determine that the train has been placed at a "train crossing" region of the play area. The system can then trigger a display of digital content on either side of the train, the display including, for example, projections of railroad crossing arms descending on either side to a closed position, and projections of automobiles stopped on either side of the railroad crossing. In the same example, the system, via interrogation of the train RFID tag, can determine that the train has exited the train crossing region and, in response, trigger a display of additional digital content. The display of additional digital content can include, for example, projections of the railroad crossing arms ascending, and projections of the stopped automobiles resuming navigation across the railroad crossing. Thus, the system can utilize RFID tag interrogation of one or more toys to trigger one or more digital content displays that augment play experiences in the play area.

Accordingly, the system can also record and store (for example, in an operational computing environment) interrogations and associated data and/or metadata thereof to generate and trigger serialized displays of digital content. For each interrogation, the system can store a train identifier (e.g., sourced from the RFID tag of the train) and a location identifier (e.g., sourced from the RFID source that interrogated the train RFID tag). Because the system can receive and store train RFID interrogation information, the system can trigger display of digital content that may be specifically associated with play activity in the train area. For example, the system can generate and trigger live displays of railroad components (e.g., tracks, crossings, etc.) and railroad scenes (e.g., trees, cities, people, etc.) that enhance immersive aspects of play experiences. In one example, when one or more toys, such as railroad tracks, are placed onto terrain of the play area, such as trees of a forest, the system can adjust the terrain to accommodate the toy (e.g., remove the trees to accommodate railroad tracks). As another example, the system can generate a bridge over a lake to hold the placed railroad tracks as the railroad tracks are placed.

The system can leverage RFID interrogations to incorporate object and/or subject-specific information into generated and digital content. As an example, a particular region of a play area can include a "train station" zone. The train station zone can include (e.g., disposed in a floor beneath the zone) an RFID source. A subject in the particular region can place a toy (containing an RFID tag) at the train station. The subject can also place a toy train (also containing an RFID tag) at a "train track" zone (the track zone also including an RFID source). In at least one embodiment, the train station zone and the train track zone can be visually rendered in the play environment via one or more projection sources (e.g., projected digital content of a train station and train tracks).

Continuing the above example, the RFID source at the train station can interrogate the toy RFID tag and provide a received RFID identifier to the system. The system can process the received RFID identifier and determine the particular toy associated with the identifier. Concurrently, or otherwise, the RFID source at the train track can interrogate the train RFID tag and provide a received RFID identifier to the system, which processes and determines the particular train associated with the identifier. Following interrogation, the system can generate digital content (to be projected) that includes a visualization of the toy riding in the train. The system can then trigger one or more projection sources 109 to display the generated digital content, thereby providing the subject with an augmented and immersion-enhanced play environment. In one or more embodiments, the train station and/or train zone may further interrogate an RFID tag borne by the subject. In at least one embodiment, the system may process a received subject RFID identifier and, accordingly, include a rendered avatar of the subject in subsequently generated digital content (thereby further increasing play environment immersion).

Additional Description of Particular Embodiments—Tangram Area

In various embodiments, the system can include an oversized, interactive tangram puzzle. As described herein, a tangram refers to a geometric puzzle including of a first shape cut into a plurality of pieces that can be arranged to make various other shapes or to recreate the first shape. The present system can provide an immersive and interactive tangram experience by providing a tangram puzzle leveraging computer vision methods and digital content to track and digitally represent tangram puzzle pieces. In some embodiments, the tangram puzzle pieces can be oversized pieces.

Accordingly, the system can include data describing one or more tangram puzzles and tangram puzzle solutions, and can further include data and/or functions that translate and relate tangram computer vision data to the one or more tangram puzzles and tangram puzzle solutions. In at least one embodiment, the system can perform algorithmic pattern recognition techniques to relate computer vision data to one or more stored tangram puzzles and puzzles solutions, and, based on the relations, determine if a current arrangement of the tangram pieces matches a stored tangram arrangement.

For example, collecting and processing of tangram computer vision data can allow the system to determine that two or more tangram pieces have been placed in an arrangement that matches a stored tangram arrangement, such as a tangram solution. Upon making the determination, the system can trigger a display of digital content on the play area occupied by the tangram pieces. The digital content can include, for example, a digitally rendered avatar of a subject playing with the tangram pieces, digital renderings of the tangram pieces displayed in an arrangement identical to the arrangement of the tangram pieces, an animated character, and an icon or symbol indicating that the tangram pieces have been successfully arranged.

In another example, the system can collect and process computer vision data in real-time to generate digital content that reproduces the play area, the tangram pieces therein and any subjects playing in the play area.

Figure 7:
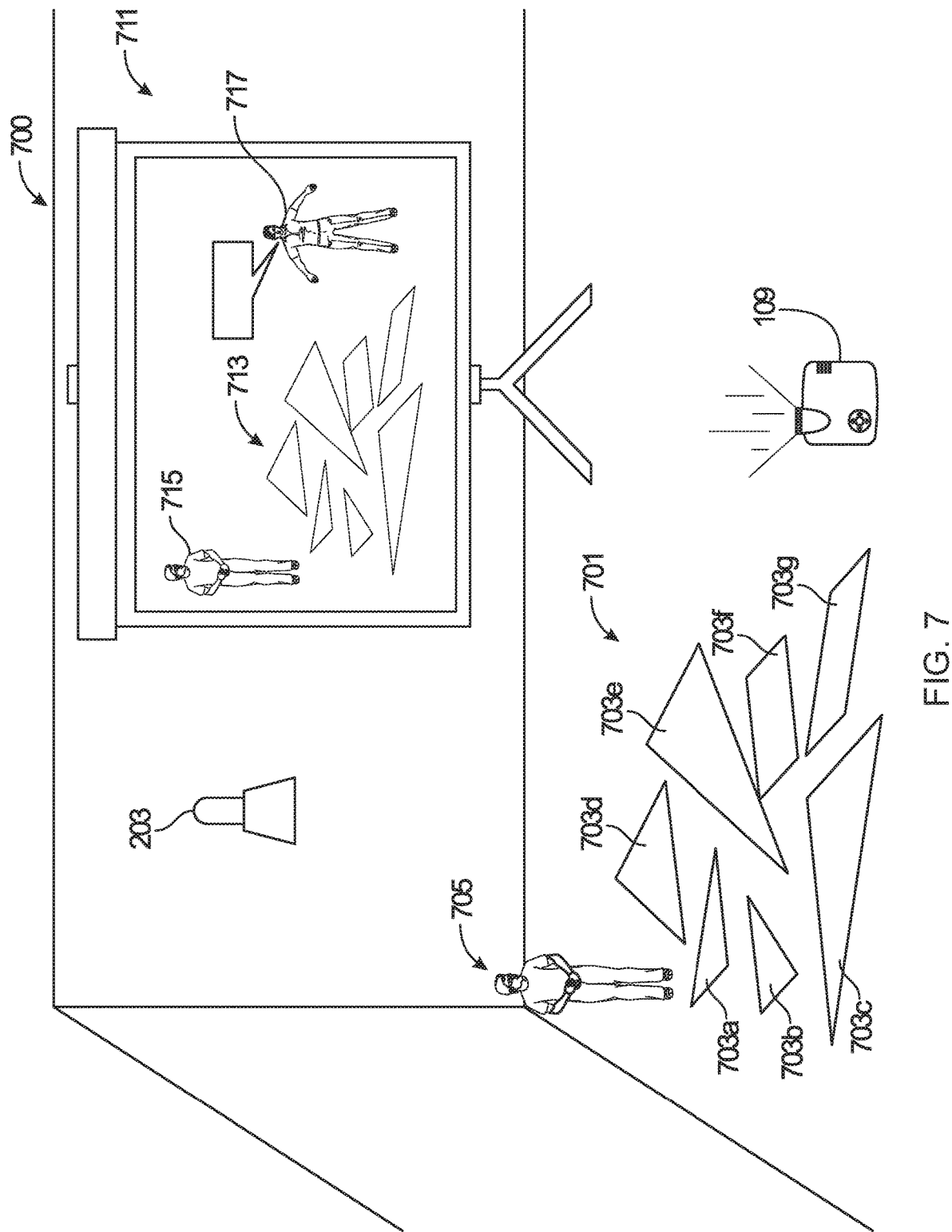
FIG. 7 illustrates an exemplary projection generation environment according to one embodiment of the present disclosure.

With reference to FIG. 7, shown is a play area 700. The play area 700 can include a tangram area 701 that includes one or more computer vision sources 203 (FIGS. 1-2). The tangram area 701 can also include a plurality of oversized, configurable tangram pieces, such as, for example, pieces 703*a-g* that form a tangram puzzle. The computer vision sources 203 can collect and process computer vision data, and track positions and orientations of the pieces 703*a-g*. A subject 705 can enter the tangram area 701 and attempt to solve the tangram puzzle by manipulating the pieces 703*a-g* into a particular configuration. The computer vision sources 203 can collect data from the tangram area 701 including, but not limited to, positions of the subject 704 and each piece 703*a-g*. The computer vision sources 203 can process and provide collected data to a networked and/or operational environment that generates one or more projection commands. The one or more projection commands can include digital content 711 that is a digital rendering of the tangram area 701 as presently viewed by the computer vision sources

203. The system can transmit the one or more projection commands to projection sources 109 (FIG. 1) that display the digital content 711 in the play area 700 (and in view of the subject 705).

The digital content 711 can include a virtual tangram area 713 that is a digitally rendered mirror of the tangram area 701 (in particular, the pieces 703*a-g*). The virtual tangram area 713 can include digital renderings of each of the pieces 703*a-g* and the digital renderings may precisely match relative positions and orientations of the pieces 703*a-g*. The digital content 711 can further include, but is not limited to, an avatar 715 that is a digital rendering of the subject 705, and a digital character 717 that provides encouragement and tips to the subject 705. The digital character 717 can provide information, to the subject 705, through captions (e.g., word bubbles) included in the digital content 711. For example, the system can cause the character 717 to provide explanatory and/or encouraging statements to the subject and/or the avatar by projecting a text box along with the digital content and/or by transmitting, via one or more audio sources (not illustrated), explanatory and/or encouraging audio clips into the play area.

As the subject 705 continues to configure and manipulate the pieces 703*a-g*, the computer vision sources 203 can continue data collection and processing. Accordingly, the system can continuously cause the projection sources 109 to generate new iterations of the digital content 711 such that the most current arrangement of the pieces 703*a-g* is reflected in the virtual tangram area 713. Throughout manipulation of the pieces 703*a-g*, the system can also compare arrangements of the pieces 703*a-g* to predefined arrangements (stored in the system) and determine if a current arrangement matches a predefined arrangement.

Figure 8:
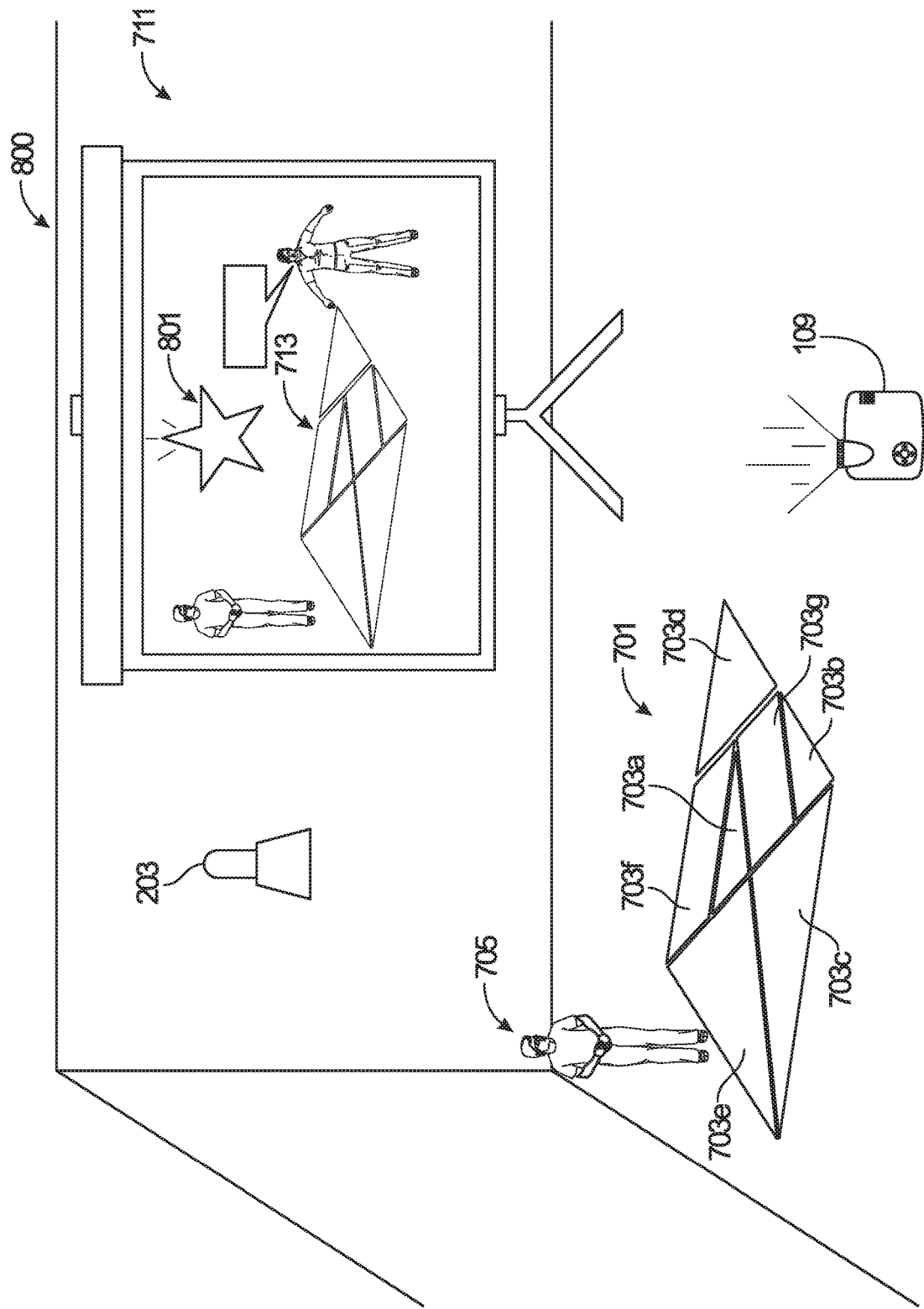
FIG. 8 illustrates an exemplary projection generation environment according to one embodiment of the present disclosure.

With reference to FIG. 8, shown is a play area 800, which may be substantially similar, but temporally subsequent, to the play area 700 (FIG. 7). The play area 800 can include the tangram area 701 (FIG. 7), tangram pieces 703*a-g*, subject 705, computer vision sources 203, and projection sources 109. The system, as described herein, can continuously receive computer vision data regarding the pieces 703*a-g* as they are manipulated by the subject in the tangram area 701. The system can continuously cause the projection sources 109 to display iterative digital content 711 and can compare the arrangement of the pieces 703*a-g* to one or more predefined arrangements, such as, for example, tangram solutions. Upon determining that the arrangement of the pieces 703*a-g* matches a predefined arrangement, the system can generate an additional projection command that includes an achievement indicator 801 and causes the projection sources 109 to display the indicator 801 with the digital content 711. The achievement indicator 801 can signify and communicate successful completion of the tangram puzzle. For example, the achievement indictor 801 can be a shining star graphic that moves throughout the digital content 711. In at least one embodiment, the system, upon determining the match, can also transmit commands to one or more audio sources disposed in the play area 800, and the commands can cause the one or more audio sources to emit a victory audio clip (for example, a celebratory melody or applause).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media, which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method for triggering projected content displays, comprising:
    defining a desired arrangement indicative of a respective desired position of a plurality of objects;
    receiving first image data from a computer vision source located within a physical environment comprising the plurality of objects;
    determining a respective position of the plurality of objects in the physical environment based on the image data;
    determining an arrangement of the plurality of objects based on the respective positions;
    determining a respective identity of the plurality of objects based on the image data;
    determining at least one object of the plurality of objects that is not located in the physical environment at the corresponding desired position based on the respective identities of the plurality of objects and the mismatch between the arrangement and the desired arrangement; and in response to determining the arrangement of the plurality of objects does not match the desired arrangement, transmitting a projection command to a projection source located within the physical environment, wherein:
 the projection command causes the projection source to display, in the physical environment, a projection that indicates the arrangement of the plurality of objects does not match the desired arrangement;
 the projection comprises at least one instructive indicium that instructs a user to move one or more of the plurality of objects; and
 the at least one instructive indicium indicates the at least one object that needs to be moved.

2. The method of claim 1, wherein:
the projection comprises instructive indicia indicative of the desired arrangement.

3. The method of claim 1, further comprising:
in response to determining the arrangement of the plurality of objects does not match the desired arrangement, transmitting a command to an audio source located within the physical environment, wherein the audio command causes the audio source to emit, in the physical environment, an audio clip that indicates the arrangement does not match the desired arrangement.

4. The method of claim 1, further comprising:
subsequent to transmitting the projection command to the projection source, receiving second image data from the computer vision source;
determining a respective updated position of the plurality of objects in the physical environment based on the second image data;
determining a second arrangement of the plurality of objects based on the respective updated positions; and
in response to determining the second arrangement of the plurality of objects matches the desired arrangement, transmitting a second projection command to the projection source, wherein the second projection command causes the projection source to display, in the physical environment, a second projection indicative of a match between the second arrangement and the desired arrangement.

5. The method of claim 4, further comprising:
in response to determining the second arrangement of the plurality of objects matches the desired arrangement, transmitting a command to an audio source located within the physical environment, wherein the audio command causes the audio source to emit, in the physical environment, an audio clip indicative of the match between the arrangement and the desired arrangement.

6. The method of claim 4, further comprising:
in response to determining the second arrangement of the plurality of objects matches the desired arrangement, defining a subsequent desired arrangement for a second plurality of objects; and
transmitting a third project command to the projection source, wherein the third command causes the projection source to display, in the physical area, a third projection indicative of the second plurality of objects and the second desired arrangement.

7. The method of claim 1, further comprising:
determining the respective identity of the plurality of objects by performing shape and edge recognition on the image data.

8. The method of claim 1, further comprising:
determining, based on the image data, a position of a user's hand in the physical environment; and
causing the projection source to display the projection onto the user's hand.

9. The method of claim 8, further comprising:
continuously tracking motion of the user's hand throughout the physical environment based on the image data and additional image data from the computer vision source; and
causing the projection source to continuously update the display of the projection onto the user's hand following throughout the motion.

* * * * *